United States Patent [19]

Messing

[11] 3,802,997

[45] Apr. 9, 1974

[54] METHOD OF STABILIZING ENZYMES
[75] Inventor: Ralph A. Messing, Horseheads, N.Y.
[73] Assignee: Corning Glass Works, Corning, N.Y.
[22] Filed: Mar. 8, 1972
[21] Appl. No.: 232,740

Related U.S. Application Data

[63] Continuation-in-part of Ser. No. 767,116, Oct. 14, 1968, Pat. No. 3,666,627.

[52] U.S. Cl............... 195/68, 195/63, 195/DIG. 11
[51] Int. Cl............................................. C07g 7/02
[58] Field of Search................. 195/63, 68, DIG. 11

[56] References Cited
UNITED STATES PATENTS
3,666,627   5/1972   Messing .............................. 195/68
3,523,871   8/1970   Matsuoka et al. ..................... 195/63

OTHER PUBLICATIONS

McLaren et al., Archives of Biochemistry and Biophysics, Vol. 61, pages 158–173 (1956).

*Primary Examiner*—Lionel M. Shapiro
*Attorney, Agent, or Firm*—James A. Giblin

[57] ABSTRACT

This invention relates to an improved method of stabilizing enzymes by bonding the enzymes to inorganic carriers in the presence of their substrates whereby the enzymes become insolubilized; and the product formed by the method.

4 Claims, 1 Drawing Figure

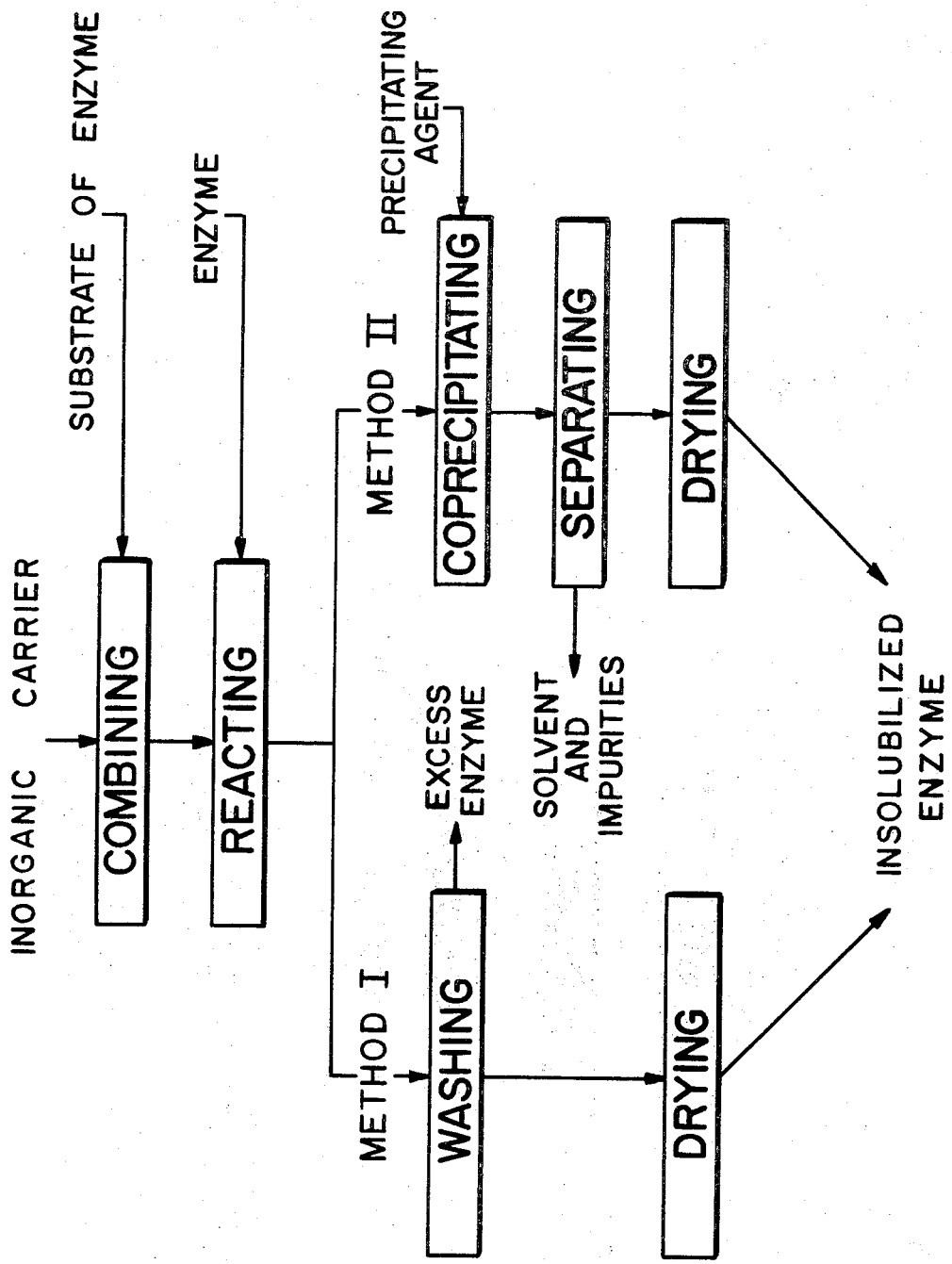

METHOD OF STABILIZING ENZYMES

This application is a continuation-in-part of my pending application Ser. No. 767,116, filed Oct. 14, 1968, now U.S. Pat. No. 3,666,627.

An enzyme is generally considered a biological catalyst capable of initiating, promoting, and governing a chemical reaction without being used up in the process or becoming part of the product formed. It is a substance synthesized by plants, animals, some viruses and microorganisms. All enzymes isolated thus far have been found to be proteins, i.e., peptide polymers of amino acids. An enzyme may contain prosthetic groups such as flavin adenine dinucleotide, porphyrin, diphosphopyridine nucleotide, etc. Most enzymes are macromolecules, generally, having a molecular weight greater than 6,000.

The specificity of enzymes and their ability to catalyze reactions of substrates at low concentrations have been of particular interest in chemical analyses. Enzyme catalyzed reactions have been used for some time for the qualitative and quantitative determination of substrates, activators, inhibitors, and also enzymes themselves. Until recently, the disadvantages arising from the use of enzymes have seriously limited their utility. Objection to the use of enzymes has been their instability, since they are susceptible to all the conditions which normally denature proteins, e.g., high temperature, concentration dependence, pH changes, microbial attack, and autohydrolysis. Furthermore, the cost of large amounts of enzymes has made their use in routine chemical analyses impractical.

Attempts have been made to prepare enzymes in an immobilized form without loss of activity so that one sample could be used continuously for many hours. The immobilized enzymes perform with increased accuracy all the operations of ordinary soluble enzymes; that is, they can be used to determine the concentration of a substrate, of an enzyme inhibitor, or of an enzyme activator. These have been made by physically entrapping enzymes in starch gel, polyacrylamide gel, agar, etc. Enzymes have been insolubilized by diazotizing them to cellulose derivatives and to polyaminostyrene beads. Enzymes have also been insolubilized on polytyrosol polypeptides and collodion matrices. The main disadvantages of using such organic materials are (a) that they are subject to microbial attack resulting from the presence of carbon atoms in the polymer chain whereby the carrier is broken down and the enzyme solubilized; (b) substrate diffusion in many cases becomes the limiting factor in reaction velocity thereby decreasing apparent enzyme activity; and (c) when employed in chromatographic columns, the pH and solvent conditions increase or decrease swelling which affects flow rates of the substrate through the column.

My U.S. Pat. No. 3,556,945, issued Jan. 19, 1971, describes a method of making stabilized enzymes by contacting an aqueous solution of an enzyme having available amine groups with an inorganic carrier, having a high surface area and reactive silanol groups, at up to room temperature or below and for a sufficient period of time for substantial bonding of the enzyme. By that process the enzyme is assumed to be coupled directly to the carrier by means of both hydrogen bonding and amine-silicate bonding. However, a limitation of the process is that a loss of activity may occur when there is bonding at the active sites on the enzyme molecule.

Quite surprisingly, I have discovered a method of bonding enzymes to inorganic carriers which eliminates or substantially reduces the loss of enzyme activity. This method involves bonding the enzyme to the carrier in the presence of its substrate and thus apparently blocking the active sites of the enzyme to avoid reaction of these sites with the carrier. By my improved process, highly stable enzymes can be prepared. These stabilized enzymes find considerable use in analytical chemistry and may also be used in the preparation of chemicals, pharmaceuticals, foodstuffs and the detergent industry.

As used herein with reference to enzymes the terms "stabilized," "insolubilized," and "immobilized" have the following meaning. The term "stabilized" means a decrease in loss of enzyme activity as a function of time and/or temperature. "Insolubilized" refers to substantially water insoluble and results from the coupling of the enzyme by chemical bonds to the insoluble inorganic carrier. Finally, "immobilization" is used to mean entrapment of the enzyme in a polymeric lattice or a semipermeable membrane.

In accordance with the present invention, I have discovered an enzyme composite comprising an inorganic carrier having available oxide and/or hydroxyl groups, an enzyme bonded to the carrier, and a substrate of the enzyme. Furthermore, my invention involves a method of making an insolubilized enzyme composite by combining an inorganic carrier having available oxide and/or hydroxyl groups with a substrate for an enzyme and reacting the enzyme with the carrier-substrate combination in an aqueous medium. The presence of the substrate serves to block the active site of the enzyme during bonding to prevent reaction with the carrier.

Enzymes capable of being stabilized as described herein include a wide variety of enzymes which may be classified under three general headings: hydrolytic enzymes, redox enzymes, and transferase enzymes. The first group, hydrolytic enzymes, include proteolytic enzymes which hydrolyze proteins, e.g., papain, ficin, pepsin, trypsin, chymotrypsin, bromelin, keratinase, carbohydrases which hydrolyze carbohydrates, e.g., cellulase, amylase, maltase, pectinase, chitinase; esterases which hydrolyze esters, e.g., lipase, cholinesterase, lecithinase, alkaline and acid phosphatases; nucleases which hydrolyze nucleic acid, e.g., ribonuclease, desoxyribonuclease; and amidases which hydrolyze amines, e.g., arginase, aspariginase, glutaminase, and urease. The second group are redox enzymes that catalyze oxidation or reduction reactions. These include glucose oxidase, catalase, peroxidase, lipoxidase, and cytochrome reductase. In the third group are transferase enzymes that transfer groups from one molecule to another. Examples of these are glutamicpyruvic transaminase, glutamic-oxalacetic transaminase, transmethylase, phosphopyruvic transphosphorylase. It should be noted that the enzyme can be used alone or in combination with other enzymes.

The carriers are inorganic materials having available oxide and/or hydroxide groups. These materials must be substantially water insoluble and are either weak acids or weak bases. They may also be classified in terms of chemical composition as siliceous materials or non-siliceous metal oxides. Of the siliceous materials, a preferred carrier is porous glass either in particulate form or as an integral piece such as a disc. Glass has the advantage in that it is dimensionally stable and that it can be thoroughly cleaned to remove contaminants as, for example, by sterilization. Porous glass useful as a carrier is readily available and sold commercially by Corning Glass Works as Code 7930 porous glass. Such porous glass can be prepared having various pore dimensions in accordance with the teachings of Hood et al., U.S. Pat. No. 2,106,764, Chapman et al., U.S. Pat. No. 3,485,687, and W. Haller, U.S. Pat. No. 3,549,524. Other siliceous inorganic carriers which can also be used include colloidal silica (commercially available under the trademark CAB-O-SIL), wollastonite (a natural occurring calcium silicate), dried silica gel, and bentonite. Representative non-siliceous metal oxides include alumina and hydroxyapatite. These representative inorganic carriers may be classified as shown in the table below:

INORGANIC CARRIERS

| Siliceous | | Non-Siliceous Metal Oxides | |
|---|---|---|---|
| Amorphous | Crystalline | Acid MeO | Base MeO |
| Glass | Bentonite | $Al_2O_3$ | Hydroxy Apatite |
| Silica Gel | Wollastonite | | |
| Colloidal Silica | | | |

In order to form the highly insolubilized enzyme and to prevent loss of enzyme activity, a substrate of the particular enzyme must be present during the bonding procedure. The importance of this may be illustrated in the bonding of trypsin wherein by forming an enzyme-substrate complex prior to the carrier, the amino groups in the active sites, i.e., nitrogen in the histidine residue, is occupied by the substrate. Masking these groups prevents reaction between the active sites of the enzyme and the carrier and leaves the sites available for future enzymatic reactions. The substrate additionally functions as a cushion to prevent deformation of the enzyme molecule and as a complexing agent to reinforce the internal bonds of the enzyme. It is essential that the substrate be tailored to the specific enzyme. The amount of substrate present during bonding should be sufficient to protect the enzyme during bonding. Usually an equal amount by weight of enzyme to substrate may be used as a rough examination. Substrates can be used alone or in combination as long as they are compatible. But when two or more different types of enzymes are to be bonded, best results will be obtained when a substrate for each type of enzyme is present. Substrates for specific enzymes are shown in the table below.

TABLE OF ENZYMES AND RECOMMENDED PROTECTIVE SUBSTRATES

| Enzyme | Substrate |
|---|---|
| 1. Proteolytic: | |
| papain, ficin, pepsin, trypsin, chymotrypsin bromelin, alkaline protease | casein, gelatin, hemoglobin, albumin, etc. |
| 2. Carbohydrases: | |
| (a) cellulase | cellulose, carboxymethyl cellulose |
| (b) amylase | starch |
| (c) maltase | maltose |
| (d) pectinase | pectin |
| (e) chitinase | chitosan, chitin, chitin nitrate |
| 3. Esterases: | |
| (a) lipases | fats, oil, triglycerides |
| (b) cholinesterase | acetylcholine |
| (c) lecithinase | lecithin |
| 4. Nucleases: | |
| (a) ribonuclease | ribonucleic acid |
| (b) desoxyribonuclease | desoxyribonucleic acid |
| 5. Amidases: | |
| (a) arginase | arginine |
| (b) asparaginase | asparagine |
| (c) urease | urea |
| 6. Redox Enzymes: | |
| (a) glucose oxidase | glucose, dextrose |
| (b) peroxidase | peroxide |
| 7. Transferases: | |
| (a) glutamic pyruvic transaminase | glutamic acid |
| (b) phosphopyruvic transphosphorylase | phosphopyruvic acid |

The accompanying drawing, which is a flow sheet of the novel process, while not intended as a definition essentially illustrates the invention. A full discussion of the drawing is set forth hereinbelow.

Referring now to my improved method of stabilizing the enzyme, in one embodiment designated as Method I the carrier may be as formed bodies or as particulate materials. The carrier is first combined with the substrate usually in an aqueous suspension or solution. Temperature is not critical, but room temperature or slightly above is recommended. The time depends on the substrate and the temperature and generally low molecular weight substrates and higher temperatures result in shorter combining times, whereas higher molecular weight substrates and lower temperatures result in longer combining times. The term "combining" is broadly used to include saturating, coating, reacting, complexing, mixing, and dispersing. After the carrier and substrate have been combined, excess substrate may be removed.

In the next step, the enzyme in the presence of its substrate is reacted with the carrier. Actually, the reaction may be considered in two parts: initially the enzyme reacts with the substrate and thereafter the available residues of the enzyme not reacting with the substrate are permitted to react with the carrier. Generally, the enzyme in aqueous solution is added to the carrier-substrate combination. The temperature of the reaction should be very low preferably about 5°C. or below. The pH at which the reaction is conducted is also important and it is recommended that the pH be either higher or lower than the optimum pH of the enzyme substrate reaction. The reaction should be allowed to continue for a sufficient time, typically at least 20 minutes, to bond the enzyme to the carrier. The product, bonded enzyme in an aqueous medium, may be stored and used as desired.

However, for most purposes the excess enzyme is removed by filtration or centrifugation and washing in distilled water. Finally, the bonded enzyme is dried by conventional techniques such as by drying in air or vacuum, by spray drying, or freeze drying. The dried bonded enzyme may also be stored for use.

As an alternative procedure for stabilizing the enzyme, designated as Method II, the carrier is in the form of fine particulate material preferably having a maximum particle size of 150 microns. The carrier is initially combined and mixed with the substrate in an aqueous suspension whereby the carrier (having a surface charge) is dispersed in the suspension. The conditions of temperature and time are similar to the first method. The enzyme is then reacted with the carrier-substrate combination for a very short time, usually less than 5 minutes, and at low temperatures. Again there is an initial reaction between the enzyme and its substrate which is followed by the reaction between the enzyme and the carrier. It is at this point that the enzyme and the carrier are coprecipitated by the addition of a precipitating agent. Coprecipitation may be either by dehydration or charge neutralization. In dehydration, an organic solvent such as acetone or an alcohol acts as the precipitating agent. Charge neutralization results from the addition of a salt solution, e.g., ammonium sulfate and sodium sulfate, to neutralize the charge on the protein molecules and the carrier particles. The temperature during coprecipitation should be generally below room temperature. Finally, the precipitating agent is removed by such conventional procedures as filtration, centrifuging, washing, and air drying. The product obtained is a dried stabilized enzyme composite which is initially water insoluble.

My invention is further illustrated by the following examples:

EXAMPLE I

A quantity of powdered porous 96 percent silica glass (595A pore size, 80–140 mesh U.S. Standard Sieve) was washed in 0.2 N $HNO_3$ with continuous sonication for at least 30 minutes. The glass was washed several times with distilled water and heat cycled to 625°C. under an $O_2$ stream for 30 minutes. Thereafter, the glass was cooled in the $O_2$ atmosphere. A 0.2 percent gelatin substrate solution was prepared by adding 100 ml. distilled water to 200 mg of gelatin (U.S.P. granular, 270 Bloom) and dissolving with heat and sonication.

To 500 mg. of porous glass was added 5 ml. of the gelatin solution and the mixture agitated at 37°C. for 1 ½ hours. The residual gelatin solution (3.6 ml.) was separated from the glass by decantation.

The gelatin protected glass sample was cooled to 5°C. in a water bath and then 5 ml. of an aqueous solution containing 1.39 mg/ml. of alkaline protease from B. Subtilis (commercially available as Alcalase) was added. The enzyme was allowed to react with the glass at 5°C. for 17 ½ hours. The enzyme solution was removed by filtration and the glass particles were thoroughly washed with water and air dried.

A control sample was also prepared in which 500 mg of porous glass was added to 1.4 ml. of distilled water to approximate the liquid volume remaining in the gelatin protected sample after decantation. Thereafter, the bonding procedure was similar to that of the sample in which the enzyme was bound in the presence of its substrate.

The enzyme solutions and washes for each sample were analyzed for unbound protein at a wavelength of 280 m$\mu$. The weights of the reacted glass and the amounts of enzyme bound (by difference at 280 m$\mu$) were as follows:

| Sample | Dried Sample | Enzyme Protein Bound | Enzyme mg/g |
|---|---|---|---|
| Substrate Protected | 1.023 g. | 2.36 mg | 2.31 |
| Control | 1.020 g. | 2.78 mg | 2.73 |

The bound enzyme was then assayed as follows:

A. Anson Hemoglobin (pH 9.72, 10 minutes, 37°C.)

| Sample | mg E activity/g Sample | Active Enzyme |
|---|---|---|
| Substrate Protected | 1.32 | 72% |
| Control | 0.92 | 30% |

B. Azocoll (pH 10, 15 minutes, 37°C.)

| Sample | mg E. Activity/g Sample | Active Enzyme |
|---|---|---|
| Substrate Protected | 1.32 | 57% |
| Control | 0.92 | 34% |

These results clearly show that the substrate protected system has substantially greater activity than the control and, therefore, the substrate protected system reduces the loss of enzymatic activity during bonding of the enzyme to an inorganic carrier.

EXAMPLE II

Following the procedure of Example I, 200 mg of the alkaline protease enzyme was bonded to 600 mg of amorphous colloidal silica particles (CAB-O-SIL) in the presence and absence of 200 mg of the protective gelatin substrate. The bound samples were assayed with a hemoglobin substrate at pH 9.7 with 10 minutes and 45 minutes incubation at 55°C. The results were as follows:

| Sample | Incubation Time | mg E Activity/g Sample | Active Enzyme |
|---|---|---|---|
| Substrate Protected | 10 minutes | 38.8 | 34.0% |
|  | 45 minutes | 73.3 | 64.3% |
| Control | 10 minutes | 4.8 | 1.1% |
|  | 45 minutes | 9.2 | 2.2% |

The increased recovery of the bound enzyme relative to the free enzyme at the longer incubation time (45 minutes) is due to the gradual release of enzyme into solution with time while the enzyme in free solution is destroyed by denaturation.

EXAMPLE III

Following the procedure of Example I, 0.6 gram of bentonite which had been heated to 500°C. in $O_2$ for 1 ½ hours was added to 10 ml. of a 2 percent gelatin solution. After the carrier and substrate were thoroughly mixed, 10 ml. of a 2 percent (200 mg) alkaline protease solution was added at room temperature. The mixture of carrier, substrate, and enzyme was cooled to 5°C. and allowed to react overnight. The product was filtered on a Buchner funnel, washed with distilled water, and air dried. The enzyme protein bound to the bentonite was determined from the residual protein (spectrophotometrically at 280 m$\mu$) in the wash and the filtrate. A control sample was prepared by adding 10 ml. of the 2 percent (200 mg) alkaline protease solution to 1.0 g of bentonite and allowing the mixture to react overnight. The control was then treated in the same manner as the substrate protected sample.

The weight of the reacted bentonite and the amount of enzyme bound were as follows:

| Sample | Weight | mg Enzyme Protein Bound | mg Enzyme/g Sample |
| --- | --- | --- | --- |
| Substrate Protected | 0.6870 g | 86 | 125 |
| Control | 1.1244 g | 146 | 130 |

The bound enzyme was then assayed by Anson Hemoglobin (pH 9.75, 10 minutes, 37°C.)

| Sample | mg E Activity/g Sample | Active Enzyme |
| --- | --- | --- |
| Substrate Protected | 40.0 | 32% |
| Control | 1.2 | 0.9% |

EXAMPLE IV

Following the procedure of Example III, 0.6 g of ground activated alumina was added to 10 ml. of a 2 percent gelatin solution. After the carrier and substrate were thoroughly mixed, 10 ml. of a 2 percent alkaline protease solution was added at room temperature. The mixture was cooled to 5°C. and allowed to react overnight. A control sample was prepared by adding 10 ml. of a 2 percent solution of alkaline protease to 1.0 g of the alumina.

The weights of reacted alumina and the amount of enzyme bound were as follows:

| Sample | Weight | mg Enzyme Protein Bound | mg Enzyme/g Sample |
| --- | --- | --- | --- |
| Substrate Protected | 0.6026 g | 54 | 90 |
| Control | 1.0435 g | 88 | 84 |

The bound enzyme was then assayed by Anson Hemoglobin (pH 9.75, 10 minutes, 37°C.)

| Sample | mg E Activity/g Sample | Active Enzyme |
| --- | --- | --- |
| Substrate Protected | 7.0 | 7.8% |
| Control | 1.2 | 1.4% |

EXAMPLE V

Following the procedure and using the same amount of reagents of Example III, a substrate protected and a control sample were prepared using hydroxyapatite ($Ca_{10}(OH)_2(PO_4)_6$ Baker Reagent Grade) as the carrier.

The weight of the reacted hydroxyapatite and the amount of enzyme bound were as follows:

| Sample | Weight | mg Enzyme Protein Bound | mg Enzyme/g Sample |
| --- | --- | --- | --- |
| Substrate Protected | 0.6455 g | 58 | 90 |
| Control | 1.008 g | 99 | 98 |

The bound enzyme was then assayed by Anson Hemoglobin (pH 9.75, 10 minutes, 37°C.)

| Sample | mg E Activity/g Sample | Active Enzyme |
| --- | --- | --- |
| Substrate Protected | 24.0 | 26.7% |
| Control | 4.2 | 4.3% |

EXAMPLE VI

Following the procedure of Example I, a quantity of powdered porous 96 percent silica glass (790 ± 50A pore size, 100 mesh, U.S. Standard Sieve) was cleaned and prepared for bonding. A 3 percent dextrose solution was prepared by dissolving 3 g dextrose monohydrate to 100 ml. of water. To 4.0 g of porous glass in a test tube was added 8.0 ml. of the dextrose soluton and the tube was placed in a water bath at 5°C. After the sample had cooled, 8.0 ml. of precooled glucose oxidase (45.5 units/mg, 5 mg/ml.) was added and the mixture was allowed to react for 21 ½ hours at 5°C. The glass was separated by filtration and washed with water. The enzyme solution and washes were analyzed for unbound protein at 280 m$\mu$. By protein difference the amount of enzyme bound to the glass was 5.5 mg enzyme/g sample.

A control sample was prepared in the same manner as the substrate protected sample with the exception that 8.0 ml. of distilled water was substituted for the dextrose solution. The amount of enzyme bound to the glass was 4.6 mg enzyme/g sample.

The bound glass samples were then assayed by incubation at room temperature in 0.01 M phosphate buffer, pH 7.0, using 22.4 mg beta-D-glucose per ml. buffer. To determine the $H_2O_2$ produced, a 2.5 ml. aliquot of reaction mixture was removed and 0.025 ml. of 1 percent o-dianisidine in methanol was added followed by 0.5 ml. of peroxidase (0.04 mg/ml.) solution. A unit of activity is equivalent to the production rate of 1 micromol $H_2O_2$ per hour at room temperature. The $H_2O_2$ produced is determined by its decomposition in the presence of peroxidase and o-dianisidine which upon oxidation increases the optical density at 460 m$\mu$. The results of the assay were as follows:

A. Initial Activity

| Sample | mg E Activity/g Sample | Active Enzyme |
|---|---|---|
| Substrate Protected | 0.230 | 4.25 |
| Control | 0.190 | 2.4% |

B. After 24 Hours Leaching at Room Temperature

| Sample | mg E Activity/g Sample | Active Enzyme |
|---|---|---|
| Substrate Protected | 0.094 | 1.7% |
| Control | 0.026 | 0.57% |

EXAMPLE VII

To 200 g of bentonite were added with stirring 2.0 liter gelatin solution (70 g of gelatin dissolved in 2 liter $H_2O$) at 80°C. The stirring was continued while the temperature was allowed to drop to 39°C. Then 1.0 liter of alkaline protease solution at 5°C. (60 g of alkaline protease in 1.0 liter of $H_2O$) was added with stirring and immediately 9.0 liters of acetone were added. The temperature fell to 19°C. After the mixture was stirred and permitted to settle, it was filtered and washed with acetone. The dried filtrate gave a yield of 297.5 g.

The product was assayed by the following procedures:

A. Anson Hemoglobin (pH 9.75, 37°C., 10 minutes)

| Sample | mg Enzyme/g Sample | Active Enzyme |
|---|---|---|
| Substrate Protected | 182 | 91% |

B. Azocoll in Detergent Solution (55°C., 10 ml., 50 mg Azocoll)

| Sample | mg Enzyme/g Sample | Active Enzyme |
|---|---|---|
| Substrate Protected | 250 | 125 |

C. Azocoll in Detergent Solution (37°C., 25 mg Azocoll, 10 min.)

| Sample | mg Enzyme/g Sample | Active Enzyme |
|---|---|---|
| Substrate Protected | 283 | 142% |

It was noted that the coprecipitation technique was particularly effective. The fact that the active enzyme appears to give activity values greater than 100 percent may be explained by the fact that the substrate protected bound samples has increased thermal stability at higher temperatures as compared to the free unbound enzyme.

OTHER DRYING TECHNIQUES

Although the coprecipitation technique followed by air drying was effective as a means of drying the above enzyme composite, other drying techniques may be used to avoid the rather costly and time consuming steps required in coprecipitation (e.g., dehydration by the addition of organic solvents such as acetone and alcohol followed by air drying, increases the number of processing steps required to produce the final product).

I have found that equivalently stabilized enzyme-carrier-substrate complexes can be dried by spray drying and freeze drying techniques. These two drying techniques offer many advantages over drying by coprecipitation and air drying. For example, spray drying an aqueous enzyme slurry greatly reduces the number of processing steps associated with solvent coprecipitation, e.g., high volume liquid transfer to and from filter presses, oven drying, grinding, and subsequently particle size screening. In addition, those costs associated with reclaiming the solvent are nonexistent and fire hazards inherent in the handling of solvents are not experienced. Further, since spray drying can be continuous, the added costs associated with batch processing are avoided.

Freeze drying, to a lesser extent, also offers advantages over drying by coprecipitation and exposure to air. For example, by freeze drying the enzyme composite, the use of solvents is obviated and the process is quicker. In the examples below, enzyme slurries were dried by both freeze drying and spray drying techniques and the dried products were then compared with similar composites which had been solvent coprecipitated and air dried. Surprisingly, it was found that activity retention was about the same or better when freeze drying or spray drying techniques were used. The enzyme used for the drying steps below was the alkaline protease used in Example I, above.

EXAMPLE A

Comparison of freeze dried and solvent coprecipitated protease-Cab-O-Sil-gelatin complex:

a. Freeze Drying Steps

About 10 ml. of warm 2 percent gelatin solution was added to 600 mg. of amorphous colloidal silica particles (CAB-O-SIL) with stirring. The combination was cooled to room temperature and then 5 ml. (40 mg.) protease solution (5°C.) was added. The mixture was stirred and allowed to react after stirring for about 30 minutes at 5°C. The resulting slurry was then freeze dried (Vir-Tis Freeze Drying Unit, overnight) using conventional freeze drying techniques. The yield was 815.6 mg. of Enzyme-silica-gelatin composite.

b. Solvent Coprecipitation Steps

About 10 ml. of warm 2 percent gelatin solution was added to 600 mg. of silica particles as described in Example A. The combination was cooled to room temperature and then 5 ml. (40 mg.) of protease solution (5°C.) was added, the mixture was stirred, and allowed to react in a cold room for about 2 hours. The mixture was then frozen in liquid nitrogen and 30 ml. of acetone (5°C.) was added to the frozen cake. After 1 ½ hours of extraction in the acetone, the thawed mixture was filtered over filter paper on a Buchner funnel. The product was washed on the funnel with 15 ml. of acetone and air dried. The yield was 791 mg. of enzyme-silica-gelatin composite.

The activities of both of the above products were determined with azocoll at 37°C. for 15 minutes in 0.1M $Na_4P_2O_7$ at pH 10.08 and hemoglobin at 55°C. for 45 minutes, and at 37°C. for 10 minutes at pH 9.7.

TABLE A

| Product | Theoretical (mg/protease/gm) | Azocoll, 15 minutes 37°C., pH 10.08 | | Hemoglobin 55°C., 45 minutes | | Assays (pH 9.7) 37°C., 10 minutes | |
|---|---|---|---|---|---|---|---|
| | | mg/gm | Recovery | mg/gm | Recovery | mg/gm | Recovery |
| Freeze-Dried | 49 | 63 | 129% | 60.5 | 123% | 62 | 127% |
| Solvent Coprecipitated | 51 | 71 | 139% | 56 | 110% | 52 | 102% |

Although the maximum activity recovery should be 100 percent (or equivalent to the theoretical amount of enzyme in the product), it can be seen that the assayed activity exceeds the maximum theoretical amount. These increased activities are indicative of increased enzyme stabilities of the complexed products under the assay conditions since the activity determinations were compared in identical manner to the enzyme in free solution.

EXAMPLE B

Comparison of freeze-dried and spray-dried protease bentonite-gelatin complex:

a. Freeze Drying Steps

About 5 grams of gelatin were added to 125 ml. of water at 40°C. Then 16.5 grams of bentonite (particulate) was added with stirring. The combination was cooled to 11°C. and then 5 grams of the alkaline protease were added with stirring. The mixture was allowed to react as above and then freeze-dried as above. The yield was 24.1 grams of enzyme-bentonite-gelatin composite.

b. Spray Drying Steps

About 500 grams of gelatin were added to 12.5 liters of water at 40°C. and stirred. Then 1,650 grams of bentonite were added and the combination was stirred. The mixture was cooled to 19°C. and 550 grams of the protease were added with stirring. The mixture was allowed to react for 1 hour and then spray dried in a Bowen Laboratory Spray Drying Unit at 400°F. inlet temperature and 200°F. outlet temperature.

The respective activities of the products were determined with azocoll at 37°C., 10 minutes, in a 4 percent detergent solution.

TABLE B

| Product | Theoretical (mg/protease/gm) | Azocoll | |
|---|---|---|---|
| | | mg/gm | Recovery % |
| Freeze Dried | 188.5 | 230 | 120 |
| Spray Dried | 188.5 | 245 | 130 |

TABLE C

Stability Testing 44°C., 100% Humidity, Three Days in Detergent Solution

Bound Enzyme: Detergent Solution=0.500 mg; 20 mg)
(Free Enzyme: Detergent Solution=0.100 mg; 20 mg)

| Product | % Recovery of Azocoll Activity |
|---|---|
| Freeze Dried | 34% |
| Spray Dried | 48% |
| Free Protease | 12% |

From the above tables, it can be seen that the enzyme composites of the present invention may be effectively spray dried or freeze dried while still demonstrating subsequent activity retention. The stability of the dried composites has been found to be greater than that of the free enzyme. Thus, because of the economies that can be realized by spray drying or freeze drying instead of air drying after solvent coprecipitation, the above drying methods are preferred for the enzyme composites. Because spray drying can be accomplished on a continuous basis, that method is preferred over freeze drying.

It will be apparent to those skilled in the art that many variations and modifications of the invention as hereinabove set forth may be made without departing from the spirit and scope of the invention. The invention is not limited to those details and applications described, except as set forth in the appended claims.

I claim:

1. A method of preparing an insolubilized enzyme of increased enzymatic activity which comprises the steps of:
   a. combining a substrate of the enzyme with a particulate inorganic carrier selected from the group consisting of colloidal silica and bentonite;
   b. contacting a solution of the enzyme with the carrier-substrate combination; and
   c. freeze drying the mixture of step (b).

2. The method, as claimed in claim 1, wherein the enzyme used is an alkaline protease, the substrate used is gelatin, and the carrier used is particulate silica.

3. A method of preparing an insolubilized enzyme of increased enzymatic activity which comprises the steps of:
   a. combining a substrate of the enzyme with particulate bentonite;
   b. contacting a solution of the enzyme with the substrate-silica combination; and
   c. spray drying the mixture of step (b).

4. The method, as claimed in claim 3, wherein the enzyme is an alkaline protease.

* * * * *

UNITED STATES PATENT OFFICE
CERTIFICATE OF CORRECTION

Patent No. 3,802,997           Dated  April 9, 1974

Inventor(s)  Ralph A. Messing

It is certified that error appears in the above-identified patent and that said Letters Patent are hereby corrected as shown below:

Column 1, line 44, "polytyrosol" should be -- polytyrosyl --.

Column 3, line 45, "examination" should be -- approximation --.

Column 9, line 6, "4.25" should be -- 4.2% --.

Column 9, line 46, "125" should be -- 125% --.

Signed and sealed this 1st day of October 1974.

(SEAL)
Attest:

McCOY M. GIBSON JR.
Attesting Officer

C. MARSHALL DANN
Commissioner of Patents